United States Patent
Goldberg

(10) Patent No.: US 7,353,571 B2
(45) Date of Patent: Apr. 8, 2008

(54) FLUID FILLED ATTACHMENT DEVICE

(75) Inventor: Edward Goldberg, Teaneck, NJ (US)

(73) Assignee: Forever Green Holdings LLC, Leonia, NJ (US)

( * ) Notice: Subject to any disclaimer, the term of this patent is extended or adjusted under 35 U.S.C. 154(b) by 0 days.

(21) Appl. No.: 10/444,225

(22) Filed: May 23, 2003

(65) Prior Publication Data

US 2004/0231116 A1    Nov. 25, 2004

(51) Int. Cl.
A44B 13/02    (2006.01)

(52) U.S. Cl. ................................ 24/599.6; D8/356

(58) Field of Classification Search ............... 24/599.1, 24/599.2, 599.6, 588.1, 601.5, 452, 598.2, 24/598.3, 598.7, DIG. 35; 428/13; 40/406; D8/356; 33/364
See application file for complete search history.

(56) References Cited

U.S. PATENT DOCUMENTS

| | | | | |
|---|---|---|---|---|
| 2,745,198 A * | 5/1956 | Nelson | .......................... | 40/406 |
| 3,286,358 A * | 11/1966 | Smokowski | .................. | 33/364 |
| 4,093,973 A | 6/1978 | Vaagenes | .................... | 362/104 |
| 4,148,199 A | 4/1979 | Boykin | ........................... | 63/12 |
| 5,006,375 A | 4/1991 | Mangan | ........................ | 428/13 |
| 5,104,699 A * | 4/1992 | Pantaleo et al. | .............. | 428/13 |
| 5,270,909 A * | 12/1993 | Weiss et al. | ................. | 362/208 |
| 5,292,564 A * | 3/1994 | Lee | .............................. | 428/13 |
| 5,329,675 A * | 7/1994 | McLean et al. | ............. | 24/599.6 |
| 5,525,382 A * | 6/1996 | White | ......................... | 428/13 |
| 5,617,657 A * | 4/1997 | Kahn | ........................... | 40/406 |
| 6,484,425 B1* | 11/2002 | Hirsch | ......................... | 40/406 |
| 6,548,128 B2* | 4/2003 | Auld et al. | .................... | 428/13 |
| D483,519 S * | 12/2003 | Liu et al. | .................... | D27/142 |
| 6,715,898 B1* | 4/2004 | Huang | ......................... | 362/191 |
| 7,126,484 B1* | 10/2006 | Luquire | ...................... | 340/574 |

OTHER PUBLICATIONS

Internet web page—Clip-On Carabiner with Liquid Filled Compass; no date is given.

* cited by examiner

*Primary Examiner*—Jack W. Lavinder
(74) *Attorney, Agent, or Firm*—Michael R. Gilman; Kaplan Gilman Gibson & Dernier

(57) ABSTRACT

An attachment device is provided comprising at least one fluid filled cavity formed therein. The attachment device is preferably in the form of a carabiner in which at least a portion of the carabiner body is formed of a transparent material such that the fluid filled cavity is visible. In a preferred embodiment an indicia bearing means is visibly disposed within said cavity.

40 Claims, 5 Drawing Sheets

FLUID FILLED ATTACHMENT DEVICE

FIELD OF THE INVENTION

The invention relates generally to attachment devices having a fluid-containing cavity.

BACKGROUND OF THE INVENTION

Attachment devices such as snap hooks and carabiners have long been in use for providing a means for attaching articles to each other. Such devices have numerous applications, such as for example enabling multiple articles to be secured to a backpack, purse, handbag, key chain or the like. As such, these devices are fairly ubiquitous. An example of an attachment device is a carabiner such as is disclosed in U.S. Pat. No. 5,005,266.

Fluid-filled ornamental articles are known in the art. For example, U.S. Pat. No. 4,148,199 relates to a pierced earring with liquid visible therein. U.S. Pat. No. 4,093,973 relates to a liquid filled ornamental article of jewelry containing an illumination source. U.S. Pat. No. 5,006,375 relates to an ornamental article having a transparent housing shaped into a decorative configuration having a liquid therein and a subatmospheric pressure area between the liquid and housing. However, none of the prior art liquid filled ornamental articles have the utility of providing a means for attaching articles to each other and providing an indicia bearing means on a ubiquitous useful article.

SUMMARY OF THE INVENTION

The invention provides an attachment device comprising at least one fluid filled cavity formed therein. The attachment device is preferably in the form of a carabiner in which at least a portion of the carabiner body is formed of a transparent material such that the fluid filled cavity is visible. In a preferred embodiment an indicia bearing means is visibly disposed within said cavity.

OBJECTS OF THE INVENTION

It is an object of the present invention to provide a fluid filled attachment device that is aesthetically pleasing.

It is a further object of the present invention to provide a novel attachment device that provides an interior fluid filled cavity capable of containing an indicia-bearing medium.

It is still a further object of the present invention to provide in a novel attachment device a free-floating indicia-bearing medium in said fluid filled cavity.

It is yet a further object of the present invention to provide in a novel attachment device a fixed indicia-bearing medium in said fluid filled cavity.

It is still a further object of the present invention to provide a novel attachment device in the form of a carabiner that provides an interior fluid filled cavity capable of containing an indicia-bearing medium.

DETAILED DESCRIPTION OF THE PREFERRED EMBODIMENT

Figure 1:
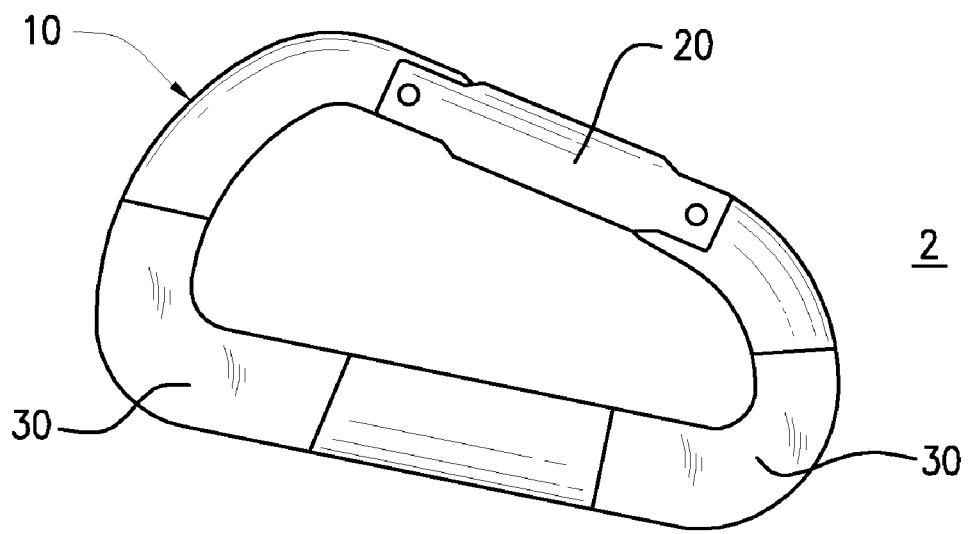
FIG. 1 is a front view of a preferred embodiment of the present invention.
Figure 2:
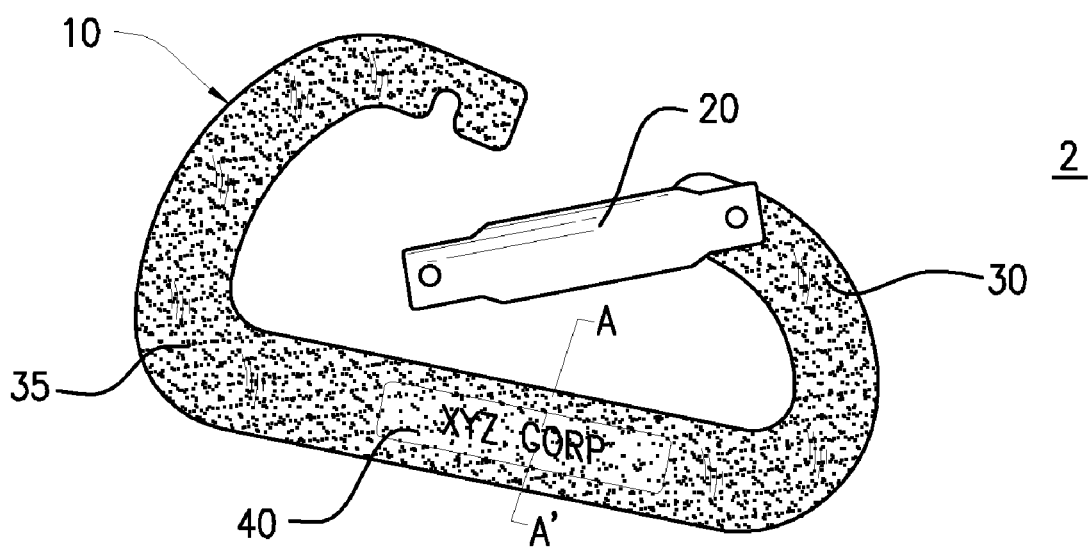
FIG. 2 is a perspective view of a preferred embodiment of the invention of FIG. 1.

Now referring to FIGS. 1-3, a preferred embodiment of the device 2 comprises essentially a body member 10, at least one openable gate member 20, at least one cavity 30 formed in the device 2 and a fluid 35 contained in said cavity 30. Device 2 optionally further includes an indicia-bearing device 40 contained in said cavity 30.

Body member 10 comprises an elongated member comprising a first end and a second end and is fabricated of any material suitable for attachment devices such as but not limited to bare or coated metal, wood, rubber or plastic or combinations thereof. Gate member 20 comprises an elongated member pivotally attached at one end to one end of said body member 10. The other end of gate member 20 contacts the other end of said body member 10 when said gate 20 is in a closed position. Now referring to FIG. 2, in a preferred embodiment gate member 20 is inwardly openable. Gate member 20 is fabricated of any suitable material as recited above for body member 10. In a preferred embodiment body 10 is curvilinear. In a most preferred embodiment body member 10 is formed in the shape of a carabiner.

Figure 4:
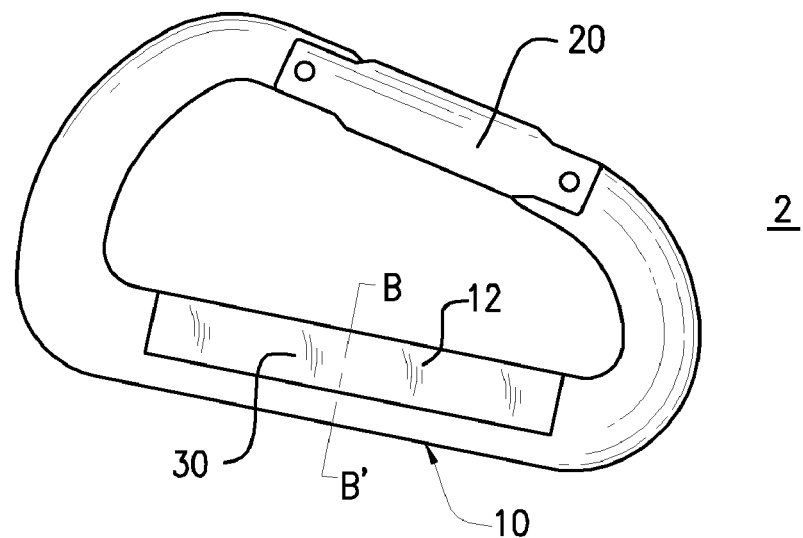
FIG. 4 is a perspective view of a further preferred embodiment of the present invention.
Figure 5:
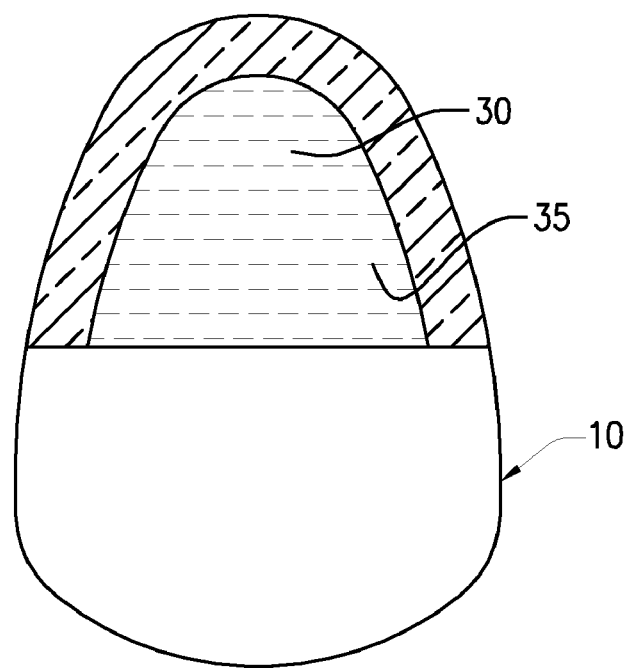
FIG. 5 is a cross sectional view of the invention of FIG. 4 taken along the line B-B'.

Cavity 30 is formed in either or both of body member 10 and gate member 20. Cavity 30 may be formed of a depression or hollow in the material of body member 10 or gate member 20, for example where the material is formed of a nontransparent material such as metal, wood, rubber or opaque plastic and sealed with a transparent material such as but not limited to readily available plastics or acrylics, polycarbonates, polyimides, methacrylates, polystyrenes or the like such that the interior of the cavity 30 is visible. Now referring to FIGS. 2 and 3, alternatively, where the material of the portion of the device 2 wherein the cavity 30 is formed is a transparent material the cavity 30 can be a chamber formed therein by thermoforming, blow molding, boring or the like. Now referring to FIGS. 4 and 5, in yet another embodiment cavity 30 is formed between a portion of body member 10 and a transparent shell member 12.

Fluid 35 is any suitable substance that is nonreactive when employed in conjunction with the material of cavity 30. Suitable fluids 35 include colored or uncolored liquids such as but not limited to water, oil or gel or mixtures thereof; or, as seen in FIG. 2, small particulate matter 37 such as but not limited to colored or uncolored powders, grains or the like or mixtures thereof; and/or as also seen in FIG. 2 at 35 and 37 mixtures of liquids and solid particles. In a preferred embodiment fluid 35 is transparent. As is also seen in FIG. 2, those skilled in the art will recognize materials such as reflective or refractive material including but not limited to glitter and/or other insoluble material 37 may be included in fluid 35 for aesthetic purposes. It will also be recognized fluid 35 may contain a colorant. It is to be understood herein that each and every other of the embodiments of the other figures herein may also have the above particulate matter, glitter. etc. 37 within fluid 35.

Figure 3A:
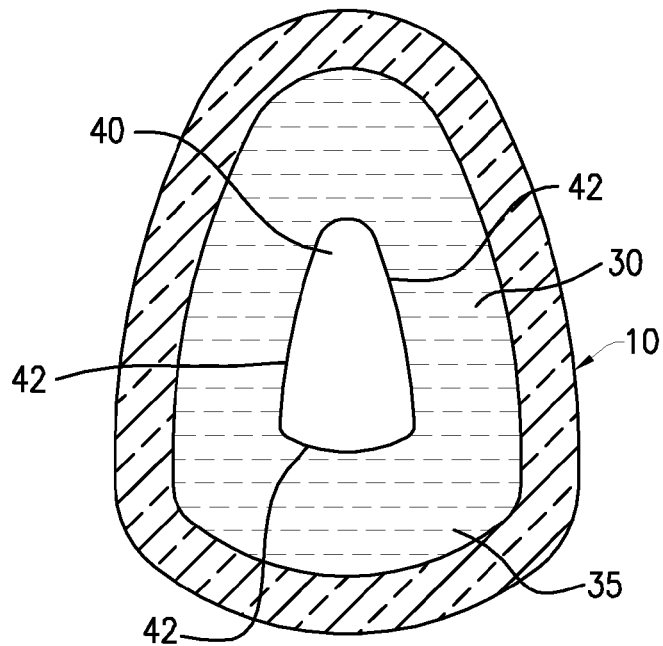
FIG. 3A is a cross sectional view of the invention of FIG. 2 taken along the line A-A'.
Figure 3B:
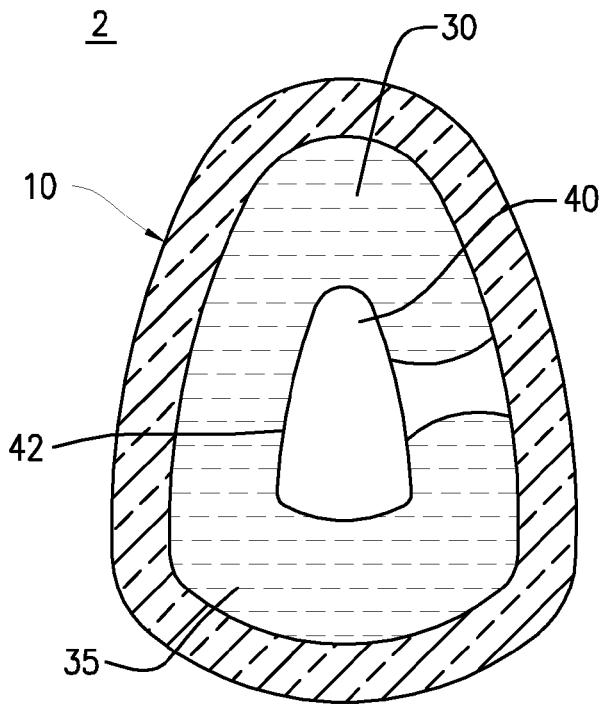
FIG. 3B is a cross sectional view of another embodiment of the invention of FIG. 2 taken along the line A-A'.

Indicia bearing device 40 is contained in cavity 30 and may be fixedly anchored within said cavity 30 (as seen in FIG. 3B) or may be unanchored so as to be free-floating or free-moving within said cavity 30 (as seen in FIG. 3A). Accordingly indicia bearing device 40 may be fabricated of any suitable material that is nonreactive with fluid 35. Suitable materials are any materials capable of receiving indicia such as ink, engraving, paint, or the like and include but are not limited to metal, wood, laminate, plastic, cork, rubber and the like. Indicia bearing device 40 may have any configuration as long as such configuration can be received and contained in said cavity 30. Now referring to FIGS. 2 and 3 in a preferred embodiment indicia bearing device 40 is elongated and has a three dimensional cross section, providing more than one indicia bearing surface 42. As seen in FIG. 3, in one embodiment indicia bearing device 40 comprises three indicia bearing surfaces 42 and each surface 42 may for example bear different indicia.

In a preferred embodiment device 2 comprises a curvilinear body 10, body 10 comprises metal having at least one cavity 30 formed therein, said cavity 30 sealed by a transparent plastic material, said cavity 30 containing a fluid 35 comprising water and further containing indicia bearing device 40, wherein said indicia bearing device 40 is elongated and is free floating in fluid 35.

Figure 6:
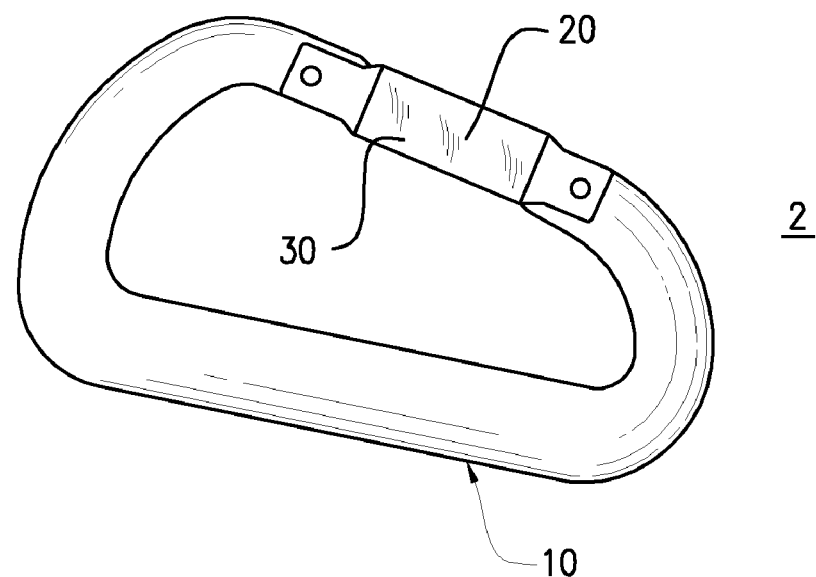
FIG. 6 is a perspective view of a further preferred embodiment of the present invention.

Now referring to FIG. 6 in a most preferred embodiment device 2 comprises a cavity 30 formed in gate 20 and body 10 is in the shape of a carabiner.

Figure 7:
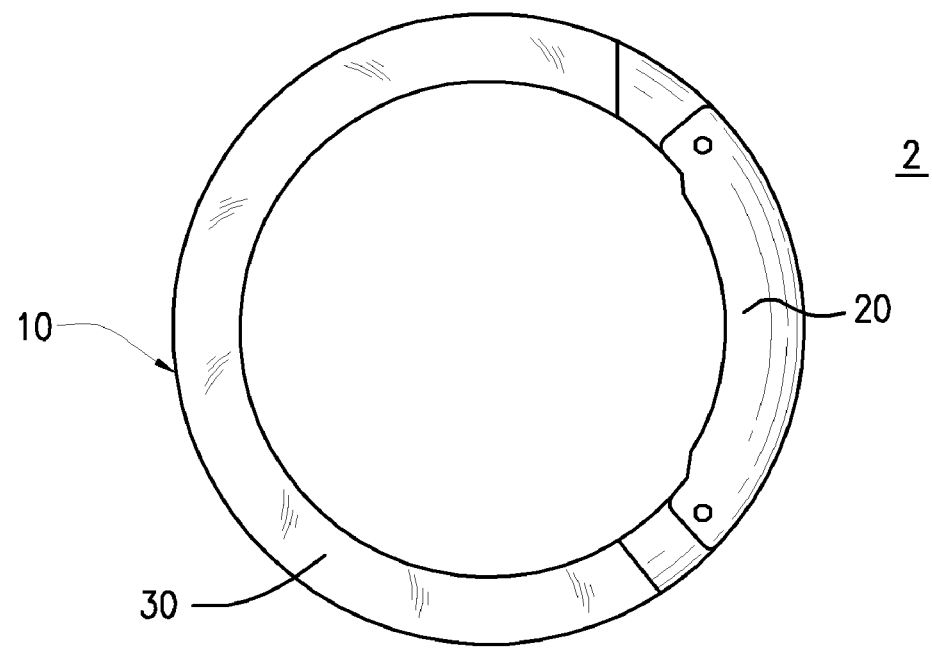
FIG. 7 is a perspective view of a further preferred embodiment of the present invention.

Now referring to FIG. 7, in an alternate preferred embodiment body 10 is in the form of a circle.

Figure 8:
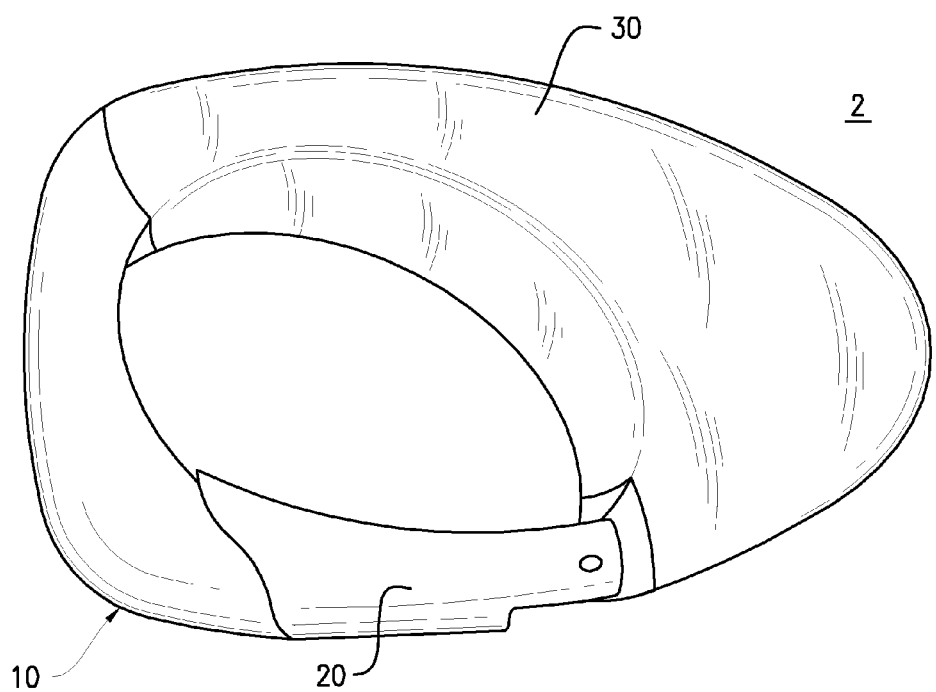
FIG. 8 is a front perspective view of a further preferred embodiment of the present invention.

Now referring to FIG. 8, in a further preferred embodiment of the present invention, cavity 30 comprises a significant portion of the device 2.

As illustrated in FIGS. 7 and 8, device 2 is not limited to the form of a carabiner but may take any suitable shape or form.

While the preferred embodiments have been described and illustrated it will be understood that changes in details and obvious undisclosed variations might be made without departing from the spirit and principle of the invention and therefore the scope of the invention is not to be construed as limited to the preferred embodiment.

What is claimed is:

1. A device comprising a body member and a gate member, said body member and said gate member both having first and second ends, one of said ends of said gate member being pivotally attached to one of said ends of said body member, the other of said ends of said gate member substantially contacting said other end of said body member when said gate member is in a closed position, said body member further comprising a length defined between said first and second ends of said body member and at least one fluid containing cavity formed in substantially the entirety of said length of said body member, wherein said at least one fluid is sealed within said cavity and thereby said at least one fluid is inaccessible to a user of said device.

2. The device of claim 1 further comprising at least one object contained in said cavity.

3. The device of claim 2, said object comprising at least one indicia bearing object.

4. The invention according to claim 3, wherein said indicia bearing object is anchored to an inside wall of said cavity.

5. The device of claim 3, wherein said indicia bearing object is not anchored to an inside wall of said cavity.

6. The device of claim 3 wherein said at least one indicia bearing object has at least one indicia receiving surface.

7. The device of claim 2 wherein said object comprises plastic.

8. The device of claim 1 wherein said device is constructed of metal and a transparent material.

9. The device of claim 1 wherein said body member is curvilinear.

10. The device of claim 1 wherein said device is formed in the shape of a carabiner.

11. The device of claim 1, wherein at least a portion of said body member comprises a transparent material.

12. The invention according to claim 1, wherein at least a portion of said gate member comprises a transparent material and at least one cavity formed therein.

13. The device of claim 1 wherein said fluid is selected from the group consisting of water, oil and mixtures thereof.

14. The invention of claim 1 wherein said fluid comprises particulate matter.

15. The device of claim 1 wherein said cavity contains a colorant.

16. The device of claim 1 wherein said cavity contains a reflective material.

17. The device of claim 1 wherein said cavity contains a refractive material.

18. The invention of claim 1 wherein said cavity contains glitter and an indicia bearing object.

19. A device comprising a body member and a gate member, said body member comprising sealed first and second ends, said sealed first and second ends defining therebetween a length of said body member, and said gate member having first and second ends, one of said ends of said gate member being pivotally attached to one of said sealed ends of said body member, the other of said ends of said gate member substantially contacting said other sealed end of said body member when said gate is in a closed position, said body member further comprising at least one fluid containing cavity formed in substantially the entirety of said length of said body member wherein said at least one fluid contained in said cavity is at least partially a liquid.

20. The device as recited in claim 19, further comprising at least one object contained in said at least one fluid containing cavity.

21. The device as recited in claim 20, said at least one object comprising at least one indicia bearing object.

22. The device as recited in claim 21, wherein said at least one indicia bearing object is not anchored to an inside wall of said at least one fluid containing cavity.

23. The device as recited in claim 21, wherein said at least one indicia bearing object has at least one indicia receiving surface.

24. The device as recited in claim 21, wherein said at least one indicia bearing object is anchored to an inside wall of said at least one fluid containing cavity.

25. A device comprising a body member and a gate member, said body member and said gate member both having first and second ends, one of said ends of said gate member being pivotally attached to one of said ends of said body member, the other of said ends of said gate member substantially contacting said other end of said body member when said gate member is in a closed position, said body member further comprising first and second substantially curved sections and a third section connecting said first and second sections, said third section located substantially opposite said gate member and having a length defined between said first and second sections equal to or longer than said gate member, said body member further comprising at least one fluid containing cavity formed in substantially the entirety of said length of said third section, wherein said at least one fluid is sealed within said cavity and thereby said at least one fluid is inaccessible to a user of said device.

26. The device of claim 25, further comprising at least one object contained in said cavity.

27. The device of claim 26, said object comprising at least one indicia bearing object.

28. The device of claim 27, wherein said indicia bearing object is anchored to an inside wall of said cavity.

29. The device of claim 27, wherein said indicia bearing object is not anchored to an inside wall of said cavity.

30. The device of claim 27, wherein said at least one indicia bearing object has at least one indicia receiving surface.

31. The device of claim 26, wherein said object comprises plastic.

32. The device of claim 25, wherein said body member is curvilinear.

33. The device of claim 25, wherein said device is formed in the shape of a carabiner.

34. The device of claim 25, wherein at least a portion of said third section of said body member comprises a transparent material.

35. The device of claim 25, wherein said fluid is selected from the group consisting of water, oil and mixtures thereof.

36. The device of claim 25, wherein said fluid comprises particulate matter.

37. The device of claim 25, wherein said cavity contains a colorant.

38. The device of claim 25, wherein said cavity contains a reflective material.

39. The device of claim 25, wherein said cavity contains a refractive material.

40. The device of claim 25, wherein said cavity contains glitter and an indicia bearing object.

* * * * *